United States Patent [19]

Evans et al.

[11] Patent Number: 6,028,157
[45] Date of Patent: *Feb. 22, 2000

[54] VINYL-CONTAINING SILANOL-TERMINATED SILICONE COMPOSITIONS FOR TREATMENT OF FILLERS

[75] Inventors: Edwin Robert Evans, Clifton Park; James Edward Doin, Hoosick Falls, both of N.Y.

[73] Assignee: General Electric Company, Pittsfield, Mass.

[*] Notice: This patent issued on a continued prosecution application filed under 37 CFR 1.53(d), and is subject to the twenty year patent term provisions of 35 U.S.C. 154(a)(2).

[21] Appl. No.: 08/867,915

[22] Filed: Jun. 3, 1997

Related U.S. Application Data

[62] Division of application No. 08/689,959, Aug. 16, 1996, Pat. No. 5,674,935, which is a continuation of application No. 08/608,975, Feb. 29, 1996, abandoned, which is a continuation of application No. 08/528,179, Sep. 14, 1995, abandoned, which is a continuation of application No. 08/297,433, Aug. 29, 1994, abandoned, which is a continuation of application No. 07/629,772, Dec. 18, 1990, abandoned.

[51] Int. Cl.$^7$ .................................................... C08G 77/20
[52] U.S. Cl. ............................ 528/32; 556/459; 523/212
[58] Field of Search ............................ 556/459; 528/32; 523/212

[56] References Cited

U.S. PATENT DOCUMENTS

| | | | |
|---|---|---|---|
| 4,075,168 | 2/1978 | Ponomarev et al. | 260/4.56 R |
| 4,360,610 | 11/1982 | Murray et al. | 523/212 |
| 4,417,024 | 11/1983 | Koda et al. | 524/861 |
| 4,525,528 | 6/1985 | Bush et al. | 524/860 |
| 4,529,774 | 7/1985 | Evans et al. | 524/860 |
| 4,558,109 | 12/1985 | McAfee | 528/15 |
| 4,598,134 | 7/1986 | Hirai et al. | 528/17 |
| 4,724,167 | 2/1988 | Evans et al. | 427/221 |
| 4,732,931 | 3/1988 | Maxson | 524/862 |
| 4,783,552 | 11/1988 | Lo et al. | 560/198 |
| 4,978,646 | 12/1990 | Bardhan et al. | 501/134 |
| 5,302,632 | 4/1994 | Maxson | 523/213 |

*Primary Examiner*—Margaret G. Moore
*Attorney, Agent, or Firm*—Kenneth S. Wheelock; Michelle Bugbee

[57] ABSTRACT

A composition is provided for treating silica filler in-situ, comprising a silanol-terminated, vinyl-containing polydiorganosiloxane having the general formula:

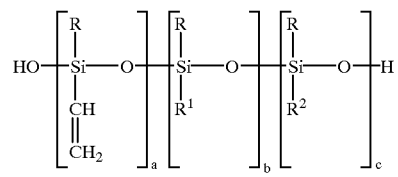

wherein R is a monovalent substituted or unsubstituted hydrocarbon radical; $R^1$ is R or a halogenated alkyl radical; $R^2$ is R or a halogenated alkyl radical; "a" is a number in the range of from about 1 to about 30; "b" is a number in the range of from 0 to about 50; and "c" is a number in the range of from 4 to about 30; the vinyl content of the polydiorganosiloxane being in the range of from about 1 to about 20% by weight and the silanol content being in the range of from about 0.1 to about 6% by weight. Preferably, R and $R^1$ are methyl, $R^2$ is methyl or 3,3,3-trifluoropropyl, and b is 0.

10 Claims, No Drawings

6,028,157

VINYL-CONTAINING SILANOL-TERMINATED SILICONE COMPOSITIONS FOR TREATMENT OF FILLERS

This is a divisional of application Ser. No. 08/689,959, now U.S. Pat. No. 5,674,935, filed on Aug. 16, 1996; which is continuation of Ser. No. 08/608,975 filed on Feb. 29, 1996, now abandoned, which is a continuation of Ser. No. 08/528,179 filed on Sep. 14, 1995, also now abandoned, which is a continuation of Ser. No. 08/297,433 filed on Aug. 29, 1994, also now abandoned, which is a continuation of Ser. No. 07/629,772, filed on Dec. 18, 1990, also now abandoned.

BACKGROUND OF THE INVENTION

This invention relates to silica fillers useful in reinforcing silicone elastomeric compositions. More particularly, this invention relates to compositions for treating silica fillers such that the treated filler improves the mechanical and handling properties of silicone elastomers made with the treated filler.

Silicone elastomers have been widely valued for their resistance to moisture and their high and low temperature stability. Silicone elastomers have been developed which also exhibit excellent handling characteristics. These characteristics are accomplished through the use of treated fillers, usually treated finely divided silica, or by modifiying the curable siloxane polymers.

Treating silica fillers with silicone treating agents is known in the art. For example, U.S. Pat. No. 4,529,774 (Evans et al.) discloses a method for treating silica fillers whereby silica fillers are contacted at a temperature of from 240–310° C. for 4–16 hours while purging volatiles and water and maintaining pressure of from 0 to about 15 psig, with a fluoroalkyl-functional diorganopolysiloxane treating agent, such as a hydrolyzate containing fluoroalkyl-functional cyclic polysiloxanes and low molecular weight diorganopolysiuxoanes. Fluorosilicone gums made using the treated fillers exhibit improved mechanical properties, especially tear strength and compression set, and improved ease of handling in mixing, milling and extrusion.

Another method for treating silica fillers with silicone treating agents is disclosed in U.S. Pat. No. 4,724,167 (Evans et al.). Therein finely divided silica reinforcing filler is contacted at a temperature of at most about 210° C. for a sufficient time to complete the reaction with condensable diorganopolysiloxane which is in the liquid phase and which has hydroxy or alkoxy functionality readily reactive with the silica surface below about 210° C. This method has improved reproducibility and allows for the use of lower reaction temperatures.

The properties of heat cured silicone rubber are largely determined by filler-to-polymer and polymer-to-polymer reactions or interactions. Currently, agents used for the in situ treatment of fillers are intended to facilitate crosslinking between filler and polymer or between polymer and polymer. These materials are primarily silanol-terminated fluids or disilazane fluids which tend to react with silanol end groups on the surface of fillers to reduce the fillers' potential for structuring an uncured compound on standing. These agents may affix fiber-like appendages to the filler either through silanol condensation or through substitution. They may also bridge over other remaining unreacted silanols to preclude them from possible future interaction. Examples of currently used treating agents include fluorosilicone telomeric disiloxanol fluids having an average silanol content of more than 6.0%; polydimethylsiloxane telomeric fluid with an average silanol content of 9 to 12%; 1,3-divinyltetramethyldisilazane; and hexamethyidisilazane.

Occasionally, fluorosilicone heat cured rubber compositions which use in-situ filler treatment are treated simultaneously with several agents such that, for example, one or more agents promote filler-filler crosslinking while one or more other agents simultaneously promote polymer-filler and polymer-polymer crosslinking. Typically, in these compositions, treatment is carried out with fluorosilicone telomeric disiloxanol fluid having an average silanol content of more than 6% and with divinyltetramethyldisilazane (VTDS). The silanol fluid functions as a processing aid as described above, i.e., it reacts with the filler's silanol groups to reduce the filler's potential for structuring. The VTDS acts as a crosslinking agent in that it causes the formation of vinyl moieties on the surface of the filler, which involves the filler in a tighter cure matrix and consequently enhances the durometer, hardness, tensile, modulus, and compression set resistance properties of the heat- or room temperature-cured rubber composition. Typically, only a small amount of VTDS is used to treat the filler.

However, with the treated fillers described above, enhancement of the mechanical properties is accompanied by losses in % elongation and tear resistance properties. This is believed to be a result of the amount of filler used. Good mechanical properties are dependent to a large extent on the crosslink density of the elastomer. Crosslink density, in turn, is a function of the amount of filler present, i.e., the more filler present, the greater the crosslink density. However, the use of filler at amounts which provide good mechanical properties can also result in a loss of elongation and tear resistance.

It would be desirable, therefore, to reduce the amount of filler needed to obtain good mechanical properties so that reductions in elongation and tear resistance properties resulting from excessive amounts of filler can be avoided.

As mentioned hereinabove, the in situ treatment of fillers in silicone rubber compositions usually involves the use of two compounds, one for reacting with the silanol groups on the filler (i.e., the silanol fluid) and the other for promoting crosslinking between filler and polymer (i.e., VTDS). The use of two compounds to treat the filler and promote crosslinking can be time consuming and costly.

Thus, it is further desirable to provide a single compound which functions both as a processing aid and as a crosslinking agent in silicone elastomer compositions.

SUMMARY OF THE INVENTION

Accordingly, it is a primary object of the present invention to provide an in situ treating agent for silica filler which results in a reduction in the amount of filler needed to obtain good mechanical properties in a vulcanizable fluorosilicone or silicone elastomer composition so that reductions in elongation and tear resistance properties resulting from excessive amounts of filler can be avoided.

It is another object of the present invention to provide a single treating agent for silica filler which functions both as a processing aid and as a crosslinking agent in vulcanizable fluorosilicone and silicone elastomer compositions.

It is another object of the present invention to provide a method for treating silica reinforcing fillers which will reduce the amount of the filler needed to achieve good mechanical properties in a silicone or fluorosilicone rubber composition.

It is also an object to provide an alternative treating agent for reinforcing silica filler in silicone or fluorosilicone rubber compositions.

It is further an object to provide an alternative crosslinking agent for reinforcing silica filler in silicone or fluorosilicone rubber compositions.

These and other objects are achieved by the present invention.

The present invention provides a composition for treating silica filler in-situ, comprising a silanol-terminated, vinyl-containing polydiorganosiloxane having the general formula:

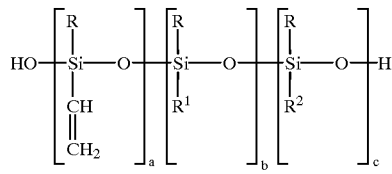

wherein R is a monovalent substituted or unsubstituted hydrocarbon radical; $R^1$ is R or a halogenated alkyl radical; $R^2$ is R or a halogenated alkyl radical; "a" is a number in the range of from about 1 to about 30; "b" is a number in the range of from 0 to about 50; and "c" is a number in the range of from 4 to about 30; the vinyl content of the polydiorganosiloxane being in the range of from about 1 to about 20% by weight and the silanol content being in the range of from about 0.1 to about 6% by weight. Preferably, R and $R^1$ are methyl, $R^2$ is methyl or 3,3,3-trifluoropropyl, and b is 0.

The invention is further directed to a method for treating silica filler with the treating composition above and to silicone elastomeric compositions containing filler treated with the treating composition.

The multi-functional composition of the present invention should provide novel opportunities to custom design properties of vulcanizable silicone and fluorosilicone elastomers to fit various end use applications.

DETAILED DESCRIPTION OF THE INVENTION

In one aspect, the present invention is directed to an in situ filler-treating composition which functions both as a processing aid and as a cross-linking agent for the vulcanizable fluorosilicone or silicone elastomeric composition containing the filler.

The composition of the present invention is an excellent in-situ filler treating agent. The composition affixes a vinyl bearing chain to a filler site and the vinyl group is usually free of influence of silanol or other groups on the surface of the filler. Consequnetly, it is more accessible for participation in a polymer-filler cure matrix. Furthermore, the existence of a short chain between the filler and cure matrix effects some degree of extensibility to enhance the tensile, elongation and tear resistance of the cured elastomer composition.

The silanol groups in the composition of the present invention serve two functions. In the compound stage, they can hydrogen bond to filler silanols to serve as a processing aid and under curing conditions they will condense to provide crosslinking between filler sites. The vinyl group is available to crosslink with polymer vinyl groups or vinyl groups previously reacted onto the filler as when tetramethyldivinyidisilazane was reacted onto the filler.

The composition of the present invention increases the crosslink density of the elastomer composition with concomitant reductions in filler loading. The amount of fluid to be added may be equivalent to the quantity of filler removed.

The composition used to treat the filler in the present invention has the general formula:

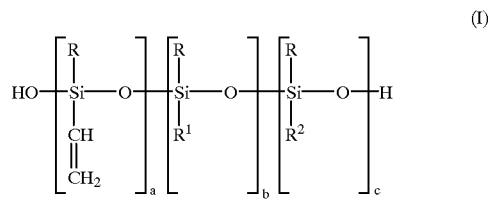

wherein R is a monovalent substituted or unsubstituted hydrocarbon radical; $R^1$ is R or a halogenated alkyl radical; $R^2$ is R or a halogenated alkyl radical; "a" is a number in the range of from about 1 to about 30; "b" is a number in the range of from 0 to about 50; and "c" is a number in the range of from 4 to about 30; the vinyl content of the polydiorganosiloxane being in the range of from about 1 to about 20% by weight and the silanol content being in the range of from about 0.1 to about 6% by weight.

In formula (I), examples of groups represented by R include alkyl groups, cycloalkyl groups, aryl groups, vinyl and halogenated alkyl groups. Preferably, R is an alkyl group, and most preferably methyl.

Examples of groups represented by $R^1$ in formula (I) include those recited for R as well as halogenated alkyls, halogenated aryls and halogenated cycloalkyls, such as 3-chloropropyl; 4-chlorobutyl; 3,3-difluoroallyl; 3,3,3-trifluoropropyl; and the like. $R^1$ is preferably a methyl or 3,3,3-trifluoropropyl radical.

$R^2$ is R or a halogenated alkyl radical, examples of which are presented above. $R^2$ is preferably either an alkyl group having 1 to about 10 carbon atoms or a fluoroalkyl group having 1 to about 10 carbon atoms such as perfluoromethyl, perflouroethyl, perfluorohexyl, and the like. Most preferably, $R^2$ is either methyl or 3,3,3-trifluoropropyl.

The vinyl content of the polysiloxane of formula (I) ranges from about 1 to about 20%, preferably from about 2 to about 10%, and most preferably from about 3 to about 7%, by weight of the polysiloxane. The silanol content of the polysiloxane ranges from about 0.1 to about 6%, preferably from about 0.1 to about 4%, and most preferably from about 0.21 to about 3.0%, by weight of the polysiloxane.

The vinyl content and silanol content of the polysiloxane of formula (I) are each critical to the present invention. Levels of vinyl greater than about 20% by weight of the polysiloxane will result in excessive cross-link density which in turn leads to poor mechanical properties. Levels of silanol greater than about 6% by weight of the polysiloxane will result in plasticization which in turn makes the elastomer composition too soft.

The polysiloxane of formula (I) may be prepared by effecting a co-condensation reaction between a poly(organovinyl)siloxanediol and either a polydiorganosiloxanediol (when $R^1$ and/or $R^2$ are an organic group, e.g., methyl) or a poly(organo-fluoroalkyl)siloxanediol (when $R^1$ and/or $R^2$ are fluoroalkyl groups. The condensation product may be neutralized with a mild base, such as sodium carbonate. Thereafter, the condensation product is made to undergo nitrogen purge and heated to a temperature in the range of about 25° C. to about 110° C. for about 30 to about 95 minutes to remove water formed during the condensation step.

The fillers treated by the composition of the present invention are finely divided reinforcing silica fillers which have free hydroxyl groups in the form of either Si-bonded functional groups or adsorbed moisture, depending on their method of preparation. The Si-bonded hydroxyl groups may also have been converted to other functional groups, such as alkoxy, in their manufacture.

These silica fillers are reinforcing fillers in contrast to other fillers of non-reinforcing, non-structure-forming type, such as titanium dioxide or calcium carbonate. Examples of silica fillers which can be used in the present invention are described in U.S. Pat. Nos. 2,541,137; 2,610,167; and 2,657,149, which are hereby incorporated by reference herein.

Such fillers can be slightly acidic or alkaline (i.e., have pH values slightly below or above 7) depending upon the method of manufacture, and may be obtained through the aerosol-aerogel process, by fuming processes such as by the vapor phase burning of silicon tetrachloride or ethyl silicate, by precipitation means, and the like.

Fumed silica is preferred for use in the present invention. Commercially available fumed silicas include CAB-O-SILO® (Cabot Corp.) and AEROSIL® (Degussa, Inc.).

The silica fillers treated according to the present invention can be raw, i.e., untreated, or pre-treated as, for example, with treating agents such as fluorosilicone telomeric disiloxanol fluids having an average silanol content of more than 6.0%; polydimethylsiloxane telomeric fluid with an average silanol content of 9 to 12%; 1,3-divinyltetramethyldisilazane; and hexamethyidisilazane.

The present invention is further directed to a method for in situ treating reinforcing silica filler and promoting crosslinking in a vulcanizable fluorosilicone or silicone elastomer composition, comprising the steps of:

(1) agitating at shear a mixture comprising by weight:
  (A) 100 parts of a silicone or fluorosilicone elastomer;
  (B) from about 10 to about 100 parts of a reinforcing silica filler;
  (C) from about 1 to about 10 parts of a treating agent comprising a silanol-terminated, vinyl-containing polydiorganosiloxane having the general formula:

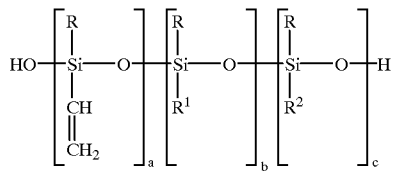

wherein R is a monovalent substituted or unsubstituted hydrocarbon radical; $R^1$ is R or a halogenated alkyl radical; $R^2$ is R or a halogenated alkyl radical; "a" is a number in the range of from about 1 to about 30; "b" is a number in the range of from 0 to about 50; and "c" is a number in the range of from 4 to about 30; the vinyl content of the polydiorganosiloxane being in the range of from about 1 to about 20% by weight and the silanol content being in the range of from about 1 to about 6% by weight, the viscosity being in the range of from about 80 to about 1000 centipoise at 25° C., and (A), (B), and (C) being agitated for a period of time sufficient to complete the reaction between the filler and the treating agent;

(2) bringing the reaction mixture of step (1) to a temperature of from about 60° C. to about 200° C. for a period of time sufficient to remove water formed during step (1).

According to the present invention, the filler is treated by agitating the filler, the base polymer (A), and the treating composition using shear mixing for a period of time sufficient to complete the reaction between the filler and the treating agent, which is typically from about 1 to about 2 hours, and preferably about 1 hour. The reaction mixture is then brought to a temperature in the range of from about 60 to about 200° C., preferably from about 150° C. to about 180° C., and maintained at that temperature for about 1 to 3 hours. This latter step effects removal of the water formed during the reaction in the previous step between the filler and the treating agent of the present invention. The reaction between the filler and the treating agent is carried out at the temperature generated by the shear mixing of the ingredients. This temperature is usually about 60–100° C. In the method of the present invention, the base polymer, filler, and treating agent of formula (I) are blended by means of shear mixing, typically at speeds ranging from about 5 to about 30 rpm.

Generally, the amount of silanol-terminated, vinyl-containing polydiorganosiloxane which is applied to the filler ranges from about 1 to about 10 parts by weight, preferably from about 3 to about 8 parts by weight, and most preferably from about 4 to about 7 parts by weight, for each 100 parts by weight silica. A composition comprising 100 parts of organopolysiloxane elastomer will generally comprise from about 10 to about 100 parts of filler and from about 0.5 to about 6, preferably from about 1 to about 5 parts, and most preferably from about 1 to about 3 parts by weight, of the treating agent of the present invention.

The present invention is further directed to a method for in situ treating reinforcing silica filler and promoting crosslinking in a vulcanizable fluorosilicone or silicone elastomer composition, comprising the step of agitating at shear a mixture comprising by weight:

(A) 100 parts of a silicone or fluorosilicone elastomer;
(B) from about 10 to about 100 parts of a reinforcing silica filler;
(C) from about 1 to about 10 parts of a treating agent comprising a silanol-terminated, vinyl-containing polydiorganosiloxane having the general formula:

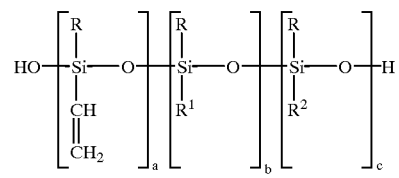

wherein R is a monovalent substituted or unsubstituted hydrocarbon radical; $R^1$ is R or a halogenated aikyl radical; $R^2$ is R or a halogenated alkyl radical; "a" is a number in the range of from about 1 to about 30; "b" is a number in the range of from 0 to about 50; and "c" is a number in the range of from 4 to about 30; the vinyl content of the polydiorganosiloxane being in the range of from about 1 to about 20% by weight and the silanol content being in the range of from about 1 to about 6% by weight, the viscosity being in the range of from about 80 to about 1000 centipoise at 25° C., and (A), (B), and (C) being agitated for a period of time sufficient to complete the reaction between the filler and the treating agent.

According to the present invention, the filler is treated by agitating the filler, the base polymer (A), and the treating composition using shear mixing for a period of time sufficient to complete the reaction between the filler and the treating agent, which is typically from about 1 to about 2 hours, and preferably about 1 hour. The reaction mixture is then brought to a temperature in the range of from about 60 to about 200° C., preferably from about 150° C. to about 180° C., and maintained at that temperature for about 1 to 3 hours. This latter step effects removal of the water formed during the reaction in the previous step between the filler and the treating agent of the present invention.

The reaction between the filler and the treating agent is carried out at the temperature generated by the shear mixing of the ingredients. This temperature is usually about 60–100° C.

In the method of the present invention, the base polymer, filler, and treating agent of formula (I) are blended by means of shear mixing, typically at speeds ranging from about 5 to about 30 rpm.

According to the present invention, the reinforcing fillers can be treated in situ in heat- or room temperature vulcanizable silicone rubber compositions or in any composition in which finely divided silica fillers are commonly used in the art. Fluorosilicone and silicone elastomer compositions suitable for use in the present invention are disclosed, for example, in U.S. Pat. No. 3,179,619 (Brown), U.S. Pat. No. 4,029,629 (Jeram), and U.S. Pat. No. 4,585,848 (Evans et al.), all of which are hereby incorporated by reference herein.

Because the fillers treated with the alkyl-substituted silanol-terminated, vinyl-containing polydiorganosiloxane (i.e., in formula (I) $R^1$ is methyl) are more compatible with silicone gums, leading to improved processing characteristics, it is preferred that those fillers be used in silicone gum compositions.

Furthermore, because the fillers treated with the fluoroalkyl-substituted silanol-terminated, vinyl-containing polydiorganosiloxane are more compatible with fluorosilicone gums, leading to improved processing characteristics, it is preferred that those fillers be used in fluorosilicone gum compositions.

The present invention is further directed to vulcanized fluorosilicone or silicone compositions containing the in situ treated reinforcing filler.

The amount of treated silica filler used in combination with curable (vulcanizable) organopolysiloxane elastomer compositions may be varied within wide limits, for instance, from 10 to 100 weight percent of the filler based on the weight of the curable organopolysiloxane elastomer. The exact amount of filler used will depend on such factors as, for example, the intended application of the cured elastomer composition, and the density of the silica filler used, the type of organopolysiloxane elastomer used. By way of illustration, when curable fluorosilicone polymer gums are used, reinforcing with about 15 to about 40 weight percent of the filler treated with the fluoroalkyl-substituted silanol-terminated, vinyl-containing polydiorganosiloxane disclosed herein has resulted in marked improvement in tear strength and compression set. When curable silicone polymer gums are used, reinforcing with about 15 to about 45 weight percent of the filler treated with the alkyl-substituted silanol-terminated, vinyl-containing polydiorganosiloxane disclosed herein resulted in marked increase in crosslink density, durometer and modulus.

Other fillers may be used in conjunction with the treated filler herein. These include, for example, untreated silica filler, titanium dioxide, lithopone, zinc oxide, zirconium silicate, iron oxide, diatomaceous earth, finely divided sand, calcium carbonate, and the like.

In order that persons skilled in the art may better understand how to practice the present invention, the following examples are offered by way of illustration and not by way of limitation.

In the Examples below, all parts are by weight.

Experimental

The Following Terms Used in the Tables Below are Defined as Follows

"Vinyl Base Polymer"—a vinyl-terminated polymethyl-3,3,3-trifluoropropylsiloxane having a viscosity of between 180,000,000 to 200,000,000 and a vinyl content of 0.01% by weight.

"Vinyl Crosslinker"—a vinyl-terminated polymethyl-3,3,3-trifluoropropylsiloxymethylvinylsiloxane having a viscosity of between 180,000,000 to 200,000,000 and a vinyl content of 1.4% by weight.

"Process Aid"—a vinyl-terminated polydimethylsiloxane having a viscosity of 400,000 centipoise at 25° C., "VOC Polymer"—a trimethylsiloxy-terminated vinyl-on-chain polysiloxane having a viscosity of 150,000–180,000 centipoise at 25° C., and a vinyl content of 4.4% by weight.

"FTS"—a fluorosilicone siloxanol fluid having a viscosity of 80–120 centipoise at 25° C., and a silanol content of 5.0–6.9% by weight.

"Fluoro-Vinyl Copolymer"—the copolymer fluid prepared in Example 1.

"Fluoro-Methyl Copolymer"—the copolymer fluid prepared in Example 8.

"DMS"—Dimethylsiloxanol telomeric fluid having a silanol content of 7–12% by weight and a viscosity of about 33 centipoise at 25° C., "Oil Resistance Additive"—magnesium oxide masterbatched in a vinyl polymer of approximate 0.2 mole % vinyl content "Heat Age Additive"—iron octoate and fumed titania dispersed in silicone gum and filler; contains silicone gum (52 parts), treated filler (10 parts), iron octoate (5 parts), and fumed titania (33 parts)

$M^{vi}DDM^{vi}$—devolatilized polydimethylsiloxane, chain-stopped with dimethyl vinyl units, having a penetration of about 800 and a vinyl content of approximately 0.01% by weight.

$M^{vi}DD^{vi}M^{vi}$—a devolatilized polydimethylcomethylvinylsiloxane, chainstopped with dimethyl vinyl units, having a penetration of about 800 and a vinyl content of approximately 0.035% by weight.

MDDM—a devolatilized polydimethylsiloxane, chain-stopped with trimethylsiloxy units, having a penetration of approximately 800.

$MDD^{vi}M$—vinyl silicone polymer, having a vinyl content of approximately 0.023% by weight and a penetration of approximately 400.

Methyl-Vinyl Copolymer—methyl-vinyl copolymer having a vinyl content of about 6.2% by weight, a silanol content of about 5.0% by weight $M^HDD^HM$—a methyl hydrogen siloxane fluid, having a hydrogen content of 0.8% by weight and a viscosity of about 36 centistokes at 25° C., Filler—precipitated silica filler or a fumed silica such as Aerosil® having a surface area of 140 square meters/gram.

EXAMPLE 1

Example 1 illustrates the preparation of a silanol-terminated vinylmethylsiloxymethyl-3,3,3-trifluoropropylsiloxane copolymer fluid within the scope of the present invention.

Anhydrous sodium carbonate (4.0 grams) was added to 1,3,5,7,9,11-hexavinyl-1,3,5,7,9,11- hexamethylhexasiloxanediol (100 grams, 6.3% OH) and a fluorosilicone siloxanol fluid having a silanol content of 6.5% (303 grams). The mixture was heated to approximately 118° C. for a period of 40 minutes while sparging with nitrogen to remove some 16 milliliters of water with cyclics. The residual fluid was filtered through Celite 545 and dried over anhydrous sodium sulfate to provide 346.8 grams (91% recovered yield) of a clear material having a viscosity of 136 centipoise at 25° C., The silanol content was 1.45 weight % while the vinyl content was 5.7%. The average degree of polymerization was 10 units in a fluorosilicone:vinylmethylsiloxy unit ratio of 6:4. The specific gravity was 1.20 g/cc.

EXAMPLES 2–4 AND COMPARATIVE EXAMPLE A

Comparative Example A and Examples 2–4 illustrate the impact of vinyl affixed to filler surface upon the physical properties of a heat cured rubber composition.

Four samples, having the composition set forth in Table 1 below, were prepared as follows:

A mixture was prepared containing the vinyl base polymer; divinyltetramethyidisilazane; the vinyl-terminated process aid; the vinyl-on-chain polymer; the fluorosilicone telomeric siloxanol (FTS); the vinyl crosslinker polymer, and the copolymer fluid prepared in Example 1. Finely divided fumed silica having a surface area of 200 square meters per gram was added incrementally with time given between each addition for the batch to mass. When the filler addition was completed and the batch was fully massed, the mixture was mixed at a shear rate of 20 rpm for 1 hour and then heated to 180° C. where it was held for 3 hours under a nitrogen blanket. Ce(OH)$_4$ was added to the resulting mixture. The mixture was cured for 15 minutes at 177° C. using Lupersol® 101 curing agent and then post baked at 200° C. for 4 hours.

TABLE 1

Formulations: Comparative Example A and Examples 2–4

| Ingredients | Comparative Example A | Example 2 | Example 3 | Example 4 |
| --- | --- | --- | --- | --- |
| Vinyl Base Polymer | 392 | 392 | 392 | 392 |
| Vinyl Crosslinker | 8 | 8 | 8 | 8 |
| Divinyltetra-methyldisilazane | 0.4 | 0 | 0 | 0.4 |
| Process Aid | 4 | 4 | 4 | 4 |
| VOC Polymer | 2 | 2 | 2 | 2 |
| FTS | 23.2 | 28 | 32 | 32 |
| Fumed Silica | 124 | 124 | 124 | 124 |
| Ce(OH)$_4$ | 3.6 | 3.6 | 3.6 | 3.6 |
| Fluoro-vinyl Copolymer | 0 | 8 | 4 | 4 |

The properties of the resulting products are shown in Table 2.

TABLE 2

Properties: Comparative Example A and Examples 2–4

| Property | Comparative Example A | Example 2 | Example 3 | Example 4 |
| --- | --- | --- | --- | --- |
| Shore A | 52 | 54 | 48 | 53 |
| 100% Modulus | 255 | 215 | 175 | 245 |
| Tensile | 1760 | 1665 | 1700 | 1700 |

TABLE 2-continued

Properties: Comparative Example A and Examples 2–4

| Property | Comparative Example A | Example 2 | Example 3 | Example 4 |
| --- | --- | --- | --- | --- |
| Elongation | 415 | 465 | 535 | 435 |
| Die B Tear | 240 | 250 | 285 | 265 |
| Specific Gravity | 1.451 | 1.448 | 1.448 | 1.448 |
| % Linear Shrinkage After Post-Bake (length) | 3.84 | 4.4 | 4.8 | 4.4 |
| % Linear Shrinkage After Post-Bake (width) | 2.1 | 2.1 | 2.5 | 2.7 |

The vinyl-on-chain fluorosilicone fluid increases the crosslink density with concomitant reductions in filler loading. The amount of fluid to be added is equivalent to the quantity of filler removed.

EXAMPLES 5–7

Three samples having the compositions set forth in Table 3 below were prepared according to the procedure described in Examples 2–4 and Comparative Example A.

TABLE 3

Formulations: Examples 5–7

| Ingredient | Example 5 | Example 6 | Example 7 |
| --- | --- | --- | --- |
| Vinyl Base Polymer | 97.7 | 97.7 | 97.7 |
| Vinyl Crosslinker | 2.3 | 2.3 | 2.3 |
| Divinyltetra-methyldi-silazane | 0.5 | 0.5 | 0.5 |
| VOC Polymer | 1.0 | 1.0 | 1.0 |
| FTS | 11.0 | 10 | 10 |
| DMS | 1 | 1 | 1 |
| Aerosil ® 200 | 50 | 49 | 50 |
| Ce(OH)$_4$ | 0.9 | 0.9 | 0.9 |
| Fluoro-vinyl Copolymer | 3.0 | 4.0 | 5.0 |

The properties of the resulting products are shown in Table 4. Compression set was measured at 177° C. for 22 hours.

TABLE 4

Properties: Examples 5–7

| Property | Example 5 | Example 6 | Example 7 |
| --- | --- | --- | --- |
| Shore A | 75 | 78 | 80 |
| 100% Modulus | 490 | 580 | 630 |
| Tensile | 1435 | 1360 | 1310 |
| Elongation | 325 | 275 | 245 |
| Die B Tear | 185 | 165 | 145 |
| Specific Gravity | 1.489 | 1.494 | 1.501 |
| Compression Set | 13.0 | 12.7 | |

EXAMPLE 8

Example 8 illustrates the preparation of a silanol-terminated vinylmethylsiloxydimethyl copolymer fluid within the scope of the present invention.

Anhydrous sodium carbonate (1.5 grams) was added to 1,3,5-trimethyl-1,3,5-trivinylcyclotrisiloxanediol (100 grams, 5.5% OH) and a methylsiloxanol fluid having a silanol content of about 7.8% (400 grams). The mixture was heated to approximately 125° C. for a period of 50 minutes while sparging with nitrogen to remove some 16.5 milliliters of water with cyclics. The residual fluid was filtered through Celite 545 and dried over anhydrous sodium sulfate to provide 320 grams (67% recovered yield) of a clear material having a viscosity of 864 centipoise at 25° C., The silanol content was about 0.23 weight % while the vinyl content was about 7.8%. The specific gravity was 1.20 g/cc.

EXAMPLES 9 AND 10 AND COMPARATIVE EXAMPLE B

Three samples were prepared having the compositions set forth in Table below.

TABLE 5

Formulations: Examples 9 and 10 and Comparative Examples B and C

| Ingredients | Comp. Example B | Example 9 | Example 10 | Comp. Example C |
|---|---|---|---|---|
| $M^{Vi}DDM^{Vi}$ | 65 | 65 | 65 | 65 |
| MDDM | 20 | 20 | 20 | 20 |
| $MDD^{Vi}M$ | 15 | 15 | 15 | 15 |
| DMS | 3 | 3 | 3 | 2 |
| $M^HDD^HM$ | 2.5 | 0 | 2.5 | 0 |
| divinyl-tetramethyl disilazane | 0.1 | 0.08 | 0.08 | 0 |
| hexamethyl-disilazane | 0.7 | 0 | 0 | 0 |
| Fluoro-methyl copolymer | 0 | 3 | 3 | 0 |
| Methyl-vinyl copolymer | 0 | 0 | 0 | 2 |
| Filler | 54 | 55 | 55 | 55 |
| Oil Resistance Additive | 1.8 | 1.8 | 1.8 | 1.8 |
| Heat Age Additive | 1.2 | 1.2 | 1.2 | 1.2 |

The samples were prepared by blending the ingredients to mass, wherein filler was added in incremental additions. The mixture was then cooked by one hour at 165° C. with 35 cubic feet per hour (CFH) $N_2$ sweep. The heat age additive and silicone oil resistance additive were then added on a 2 roll mill after cooldown. The mixture was catalyzed with 1.2 parts/1 00 of 33% Varoxg® catalyst masterbatch (i.e., 2,5-dimethyl-2,5-ditertiarybutylperoxyhexane, available from Lucidol). The mixture was then cured at 360° F. for 10 minutes. The properties are shown in Table 6.

TABLE 6

Properties: Comparative Examples B and C and Example 9 and 10

| Properties | Comp. Example B | Example 9 | Example 10 | Comp. Example C |
|---|---|---|---|---|
| Shore A | 57 | 62 | 64 | 67 |
| Tensile (psi) | 1110 | 1058 | 1004 | 880 |
| Elong. (%) | 432 | 291 | 311 | 198 |
| Tear B (ppi) | 121 | 83 | 105 | 70 |

TABLE 6-continued

Properties: Comparative Examples B and C and Example 9 and 10

| Properties | Comp. Example B | Example 9 | Example 10 | Comp. Example C |
|---|---|---|---|---|
| 100% Mod (psi) | 269 | 370 | 395 | 463 |
| Specific Gravity | 1.199 | 1.204 | 1.201 | 1.211 |

EXAMPLES 11–13

Three samples were prepared having the compositions set forth in Table 7 below.

TABLE 7

Formulations: Examples 11–13

| Ingredients | Example 11 | Example 12 | Example 13 |
|---|---|---|---|
| $M^{Vi}DD^{Vi}M^{Vi}$ | 20 | 20 | 20 |
| $M^{Vi}DDM^{Vi}$ | 20 | 20 | 20 |
| $M^{Vi}DD^{Vi}M^{Vi}$ | 2 | 2 | 2 |
| $M^{Vi}DD^{Vi}M^{Vi}$ | 58 | 58 | 58 |
| SiOH | 3 | 3 | 2 |
| $M^HDD^HM$ | 0.5 | 0 | 0.5 |
| Divinyltetramethyl disilazane | 0.15 | 0.15 | 0 |
| vinyl-triethoxysilane | 0.5 | 0 | 0 |
| Hexamethyl-disilazane | 0.7 | 0.7 | 0 |
| Filler | 65 | 65 | 65 |
| Celite Superfloss | 10 | 10 | 10 |
| Fluoro-methyl copolymer | 0 | 2 | 0 |
| Methyl-Vinyl Copolymer | 0 | 0 | 1 |
| Oil resistance Additive | 1.8 | 1.8 | 1.8 |
| Heat Age Additive | 1.2 | 1.2 | 1.2 |

The properties are shown in Table 8.

TABLE 8

Properties: Examples 11–13

| Properties | Example 11 | Example 12 | Example 13 |
|---|---|---|---|
| Shore A | 76 | 75 | 82 |
| Tensile (psi) | 1110 | 1056 | 1101 |
| Elong. (%) | 197 | 216 | 138 |
| Tear B (ppi) | 77 | 82 | 90 |
| 100% Mod. (psi) | 654 | 594 | 825 |

What is claimed is:

1. A composition suitable for promoting cross-linking in vulcanizable fluorosilicone or silicone elastomeric compositions containing a filler and enhancing elongation of the cured fluorosilicone or silicone elastomeric compositions comprising a silanol-terminated vinylorganodiorganosiloxane copolymer fluid having a viscosity of from about 80 to about 1000 centipoise at 25° C. and having the general formula:

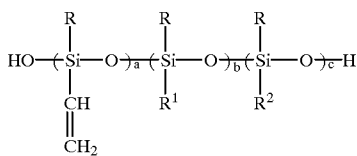

wherein each R is the same and is a monovalent hydrocarbon radical; wherein $R^1$ is an alkyl radical of from about 1 to about 10 carbon atoms; $R^2$ is R or a halogenated alkyl radical, subject to the limitation that $R^1$ and $R^2$ are different; "a" is a number in the range of from about 1 to about 30; "b" is a number in the range of from 0 to about 50; and "c" is a number in the range of from 4 to about 30, subject to the limitation that if "b" is 0, $R^2$ is different from R; the vinyl content of the polydiorganosiloxane being in the range of from about 1 to about 20% by weight and the silanol content being in the range of from about 1 to about 6% by weight.

2. A composition according to claim 1 wherein R and $R^1$ are each methyl.

3. A composition according to claim 1 wherein $R^2$ is either a methyl radical or a 3,3,3-trifluoropropyl radical.

4. A composition according to claim 1 wherein the vinyl content of the copolymer fluid is from about 2 to about 10% by weight based on the copolymer fluid.

5. A composition according to claim 4 wherein the vinyl content of the copolymer fluid is from about 3% to about 7% by weight of the copolymer fluid.

6. A composition according to claim 1 wherein the silanol content is from about 0.1% to about 4% by weight of the copolymer fluid.

7. A composition according to claim 6 wherein the silanol content is from about 0.21% to about 3% by weight of the copolymer fluid.

8. A composition according to claim 1 wherein "a" is a number in the range of from about 2 to about 12, "b" is a number in the range of from about 0 to about 3, and "c" is a number in the range of from about 5 to about 15.

9. A composition according to claim 8 wherein "a" is a number in the range of from about 2 to about 10, "b" is 0, and "c" is a number in the range of from about 5 to about 10.

10. A composition according to claim 1 wherein the filler is fumed silica.

* * * * *